United States Patent Office 3,300,416
Patented Jan. 24, 1967

3,300,416
EXCHANGE RESINS FROM VINYLBENZYL SULFONIUM RESINS AND METHOD FOR MAKING SAME
Melvin J. Hatch, Midland, Mich., assignor to The Dow Chemical Company, Midland, Mich., a corporation of Delaware
No Drawing. Filed Feb. 16, 1961, Ser. No. 89,647
20 Claims. (Cl. 260—2.1)

This application is a continuation-in-part of U.S. patent application Serial No. 771,205, filed November 3, 1958, now abandoned, which in turn, is a continuation-in-part of U.S. patent application Serial No. 674,014, filed July 25, 1957, now abandoned.

This invention concerns a method for preparing ion exchange resins and products thereof. More particularly, it concerns the preparation of cation, anion and chelating exchange resins (hereafter exchange resins) by reacting a polymeric vinylbenzylic sulfonium anion exchange resin with an ionizable reagent to establish a covalent bond therewith to give a substituted resinous vinylbenzylic polymer having ion exchanging moieties (hereafter exchanging moieties) or moieties which can be hydrolyzed or oxidized to give exchanging moieties.

Vinylaryl polymers containing halomethyl groups, such as vinylbenzyl chloride or bromide polymers and copolymers, and chloromethylated or bromomethylated polymeric styrene, including crosslinked chloromethylated or bromomethylated styrene copolymers, are not easily reacted with various nucleophilic reagents, such as the water-soluble species, $NH_2CH_2COONa$, $NaSCH_2COONa$, $NH_2-CHCO_2Na$
$\quad\quad\quad\quad\quad\quad\quad\quad\quad\quad\quad\quad\quad\quad\quad\quad\quad\quad\quad | $
$\quad\quad\quad\quad\quad\quad\quad\quad\quad\quad\quad\quad\quad\quad\quad\quad\quad\quad\quad CH_2CO_2Na$

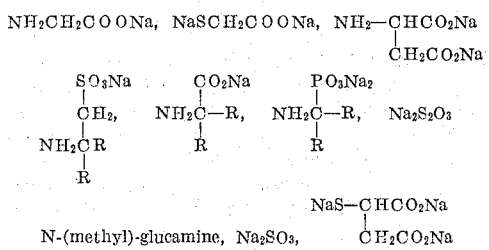

$\quad\quad\quad\quad\quad\quad\quad\quad\quad\quad\quad\quad\quad\quad\quad NaS-CHCO_2Na$
$\quad\quad\quad\quad\quad\quad\quad\quad\quad\quad\quad\quad\quad\quad\quad\quad\quad\quad\quad | $
N-(methyl)-glucamine, $Na_2SO_3$, $\quad\quad CH_2CO_2Na$ and the like, wherein R is hydrogen, an alkyl group, an aryl group, a substituted alkyl, or a substituted aryl group to establish a covalent bond therewith and to give a resinous polymer having one or more exchanging moieties. This difficulty is due mostly to the hydrophobic nature of the polymer matrix which contains halomethyl groups. Mutual solvents which will swell the polymer matrix and also dissolve such reagents are often not practical because of inefficiency in promoting the reaction. The same is often true with analogous reagents which can be converted to have exchanging moieties by a simple hydrolysis or oxidation reaction involving their substituent moieties.

It has now been discovered that polymeric vinylbenzylic sulfonium anion exchange resins can be reacted readily in swollen condition with a solution of a reagent of the type indicated above, often in aqueous solution, to give an exchange resin or which upon oxidation or hydrolysis can be converted to give an exchange resin. Highly polar solvents such as water-soluble alcohols and water-insoluble solvents such as toluene can also be used together with water or in substantially anhydrous condition in forming the nucleophilic reagent solutions. Alternatively, water-insoluble solvents or diluents dispersed in water can be used.

Although it is generally desirable to have the vinylbenzylic sulfonium resin in a water-swollen condition for reaction with the nucleophilic reagent, this is not always essential. A polar solvent or the reagent itself often can act as a swelling agent for the vinylbenzylic sulfonium resin. Whenever the reagent can be absorbed into the sulfonium resin, as by ion exchange absorption, and remain in the resin phase when the solvent is removed, it is possible to obtain reaction merely by heating the dry sulfonium resin which contains the absorbed nucleophilic reagent. Thus, the method of this invention makes it possible to bring the reagent and the reactive parts of the vinylbenzylic anion exchange resin in reactive contact.

The polymeric vinylbenzylic sulfonium halide anion exchange resins advantageously used in making the exchange resins pursuant to the procedure of this invention are the reaction products of (a) vinylaryl polymers such as those of styrene, vinyltoluene, vinylxylene, chlorostyrene, dichlorostyrene, vinylnaphthalene, acenaphthene, etc. containing an average of between about 0.25 and 1.5 halomethyl groups per aromatic nucleus, which are cross-linked, advantageously to the extent of between 0.2 and 20 weight percent, with a conventional crosslinking agent, e.g., a dialkenyl crosslinking agent such as divinylbenzene (DVB), divinyltoluene, divinylxylene, trivinylbenzene, diallyl esters, ethylene glycol diacrylate and dimethacrylate, etc.; and (b) a sulfide which contains 1 or 2 alkyl groups containing between 1 and 4 carbon atoms and/or, correspondingly, 1 or 2 hydroxyalkyl groups containing between 2 and 4 carbon atoms, i.e., dimethyl, diethyl, dipropyl, methyl hydroxyethyl, dibutyl sulfide; polymethylene sulfides and alkyl substituted polymethylene sulfides having 4 to 12 carbons atoms, from 4 to 8 of which are polymethylenic, the balance being from 1 to 4 carbon alkyl groups, etc., pursuant to the procedure of copending U.S. patent application, Serial No. 769,545, filed October 27, 1958, and now abandoned. The sulfonium anion exchange resin can be reacted in the halide form, as produced, or it can be converted to other ionic forms before reaction, e.g., the sulfate form.

In practice, the exchange resins of this invention are made by reacting a swollen polymeric vinylbenzylic sulfonium anion exchange resin, as indicated above, with a stoichiometric proportion of a nucleophilic reagent to establish a covalent bond with the benzylic carbon atoms of said resin, giving a sulfide by-product and yielding a substituted vinylbenzylic resin which has exchanging moieties, sometimes at the atom of the reagent which establishes the covalent bond, e.g., with amine reagents, or, alternatively, to yield a substituted vinylbenzylic resin which has moieties which can be converted to exchanging moieties by a simple hydrolysis or a simple oxidation reaction, e.g., with mercaptoalkanecarboxylic esters, mercaptoalkyl nitriles, and β-mercaptoalkanols.

The nucleophilic reagents which can be reacted with said sulfonium anion exchanging resins to give different exchanging resins are those which are ionizable and have an exchanging moiety (group) or a moiety which can be transformed to an exchanging moiety by a simple hydrolysis or oxidation reaction, are soluble to the extent of at least 5 weight percent in water, aliphatic liquid monohydric and polyhydric alcohols having up to 10 carbon atoms, liquid dihydric alcohol polymers such as poly(ethylene glycol), poly(propylene glycol) and polymeric mixtures of ethylene and propylene glycol having up to 10 carbon atoms and/or lower monoalkyl ethers of liquid dihydric alcohol polymers, having up to 10 carbon atoms; which reagents react in stoichiometric proportions at 20° to 100° C. with benzyl chloride to displace at least 5 mole percent of chloride therefrom in 48 hours to form a covalent linkage with the benzylic carbon atom. By ionizable is meant a reagent which has a measurable ionization in solution. These characteristics of the nucleophilic reagents used in the method of this invention encompass many diverse operable compounds and exclude inoperable compounds. The characterizing data make definite and certain to the art skilled these numerous reagents. By way of example, these reagents include simple amines and polyamines free from hydrocarbonyl and substituted hydrocarbonal groups, e.g., $NH_3$, $NH_2OH$, $NH_2$—$NH_2$, $NH_2$—$NH$—$CO$—$NH_2$ and $(NH_2$—$NH)_2CO$; metal salts of $H_2SO_3$, $H_2S_2O_3$, HSCN, $H_2S$, $H_2S_n$ (n=2, 3 or 4) and HCN; metal salts of activated methylene or methine groups, e.g., of $CH_2(COOR)_2$, $RCOCH_2COOR$, $CH(CH_3)(COOR)_2$, $RCOCH_2SO_2C_6H_5$, $RCOCH_2NO_2$, $RCOCHCH_3NO_2$, $RCOCH_2CN$, $ROCOCH_2CN$, $RCOCH_2COOR$, where R is an alkyl group having from 1 to 8 carbon atoms; hydrocarbonyl and substituted hydrocarbonyl amines and hydrazines, whether primary, secondary or tertiary, e.g., methylamine, n-amylamine, benzylamine, iso-propylamine, sec.-butylamine, allylamine, n-propylamine, n-butylamine, iso-amylamine, iso-butylamine, 2-aminoethanol, 1 - amino - 2 - propanol, histamine, 2-amino-2-methyl-1-propanol, 2-amino-2-methyl-1,3-propanediol, 2-amino-2-(hydroxymethyl)-1,3-propanediol, 2 - methoxyethylamine, n-hexylamine, p-methoxybenzylamine, 3-isopropoxy-n-propylamine, 2-ethylhexylamine, tert.-butylmine, 3-amino-1-propanol, n-octylamine, n-dodecylamine, n-decylamine, L-(+)histidine, diethylamine, dimethylamine, dibenzylamine, di - n - propylamine, di-n-butylamine, di-iso-amylamine, 2-2'-iminodiethanol, diallylamine, di-n-amylamine, 1-diethylamino-2-propanol, 1-adrenaline, di-sec.-butylamine, di-n-heptylamine, di-n-hexylamine, β,β'-iminodipropionitrile, N-methyltaurine sodium salt, N-methylcyclohexylamine, 2-ethylaminoethanol, N-ethyl-n-butylamine, iminodiacetic acid disodium salt monohydrate, iminodiacetonitrile, diethyl iminodiacetate, N-methyl-n-butylamine, trimethylamine, triethylamine, 2-dimethylaminoethanol, 2-diethylaminoethanol, 3 - diethylamino - 1 - propanol, 2,2',2''-nitrilotriethanol, tri-iso-amylamine, tri-n-amylamine, 2-di-n-butylaminoethanol, 3-di-n-butylamino-1-propanol, diethylaminoacetonitrile, 1 - dimethylamino - 2 - propanol, β-dimethylaminopropionitrile, triallylamine, 1 - di - n - butylamino-2-propanol, hexamethylenetetramine, ethylenediamine, 1,2 - propanediamine, triethylenetetramine, diethylenetriamine, N,N - diethylethylenediamine, tetraethylenepentamine, 1,6-hexanediamine, N,N-dimethyl-1,3-propanediamine, 3,3' - diaminodipropylamine, 1,8-p-methanediamine, p-aminobenzoic acid metal salts, aniline, o-anisidine, p-anisidine, 1-naphthylamine, 4-amino-1-naphthalenesulfonic acid sodium salt, sulfanilic acid sodium salt, 3-amino-p-toluenesulfonic acid metal salts, 1-amino-2-naphthol-4-sulfonic acid metal salts, o-aminophenol, p-aminophenol, 5-amino-2-naphthalenesulfonic acid metal salts, 2-amino-1-naphthalenesulfonic acid metal salts, p-bromoaniline, 8-amino-1-naphthalenesulfonic acid metal salts, p-chloroaniline, o-chloroaniline, 2,4-dimethylaniline, m-toluidine, m-aminophenol, m-cholroaniline, p-arsanilic acid metal salts, p-aminophenylacetic acid metal salts, o-aminobenzenesulfonic acid metal salts, 2-aminopyridine, 2-amino-3-methylpyridine, 2-amino-4-methylpyridine, 2-amino-5-methylpyridine, 2-amino-6-methylpyridine, phenylhydrazine, methyl hydrazine, sym-dimethyl hydrazine, unsym-dimethyl hydrazine, p-phenylenediamine, p,p'-methylenedianiline, 3,5-dimethylaniline, 2-phenylethylamine, 8-amino-1-naphthol-5-sulfonic acid metal salts, 6-amino-1-naphthol-8-sulfonic acid metal salts, m-aminoacetophenone, o-aminobenzenethiol, 4,4'-oxydianiline, 6-amino-m-toluenesulfonic acid metal salts, p - aminobenzonitrile, 2,5 - dimethoxyaniline, 2-amino-4-phenylphenol and o-arsanilic acid metal salts.

Other nucleophilic reagents include amino acids and their soluble metal salts, e.g., those of N-phenylglycine, glycine, DL-2-aminohexanoic acid, L-(−)cystine, DL-α-alanine, α-amino-iso-butyric acid, DL-α-amino-n-valeric acid, DL-β-phenylalanine, DL-α-aminophenylacetic acid, DL-2-aminooctanoic acid, DL-aspartic acid, di-iso-leucine, L-(+)glutamic acid, p-aminophenylacetic acid, DL-valine, DL-α-amino-n-butyric acid, DL-leucine, L-(−)leucine, DL-methionine, 4-aminobutyric acid, DL-serine and β-alanine.

Still other such reagents include metal salts of hydroxyl-containing compounds, e.g., the alcoholic and phenolic compounds such as 4-hydroxybenzoic acid and its metal salts, 4-hydroxy, 4'-carboxybiphenyl and its metal salts, $CH_2OH(CHOH)_4CH_2OH$, $CH_2OH(CHOH)_3CH_2OH$, 1,3-dihydroxybenzene, 1,4-dihydroxybenzene, o-hydroxybenzaldehyde, 4-hydroxybenzonitrile; metal salts of mercaptan compounds, whether alkyl or aryl, e.g., o-carboxyphenyl mercaptan, o-carboxycyclohexyl mercaptan, $HSCH_2CO_2H$, $HSCH_2CH_2CO_2H$, $HSCH_2CH_2SO_3H$, $HSCH_2PO_3H_2$, $HSCH_2CH_2OH$ $HSCH_2CH_2CN$, $HSCH(CO_2H)CH_2CO_2H$; seleno- and telluro-acids, e.g., $HSeCH_2CO_2H$, sulfinic acids $RSO_2H$, where R is a 1 to 8 carbon alkyl group or an aryl group, e.g., $C_6H_4(CO_2H)SO_2H$.

Further reagents include hydrocarbonyl amines having a substituent of the group of —$PO_2H$, —$AsO_3^=$, —$SO_2^-$, —$COSR$, —$CS_2R$, —$CN$, —$CO_2^-$, —$PSO_2^=$, —$PO_3^=$, —$SO_3^-$, —$O^-$, —$N^=$, —$BO_2H$, —$SeO_3^-$.

Of the many nucleophilic reagents characterized above which are operable in this invention, it would be expected, as was indeed found, that the smaller molecules more readily penetrate and react more rapidly with the lower and higher crosslinked vinylbenzylic sulfonium anion exchange resins, while the larger molecules of reagent more readily penetrate and react more rapidly with the lower crosslinked sulfonium resins. To determine the desirability and reaction characteristics of a given sulfonium anion exchange resin with a given higher molecular weight nucleophilic reagent, a simple trial reaction followed by a capacity test is all that is needed. Alternatively, the absorption characteristics of a sulfonium anion exchange resin for a given nucleophilic reagent can be tested by immersing a resin sample of the desired crosslinkage in a large amount of solution of the desired reagent, withdrawing the resin particles, draining the resin particles free of excess reagent, washing the reagent-wet resin with a solvent for the nucleophile and determining the amount of reagent present in the wash solution. The amount of reagent absorbed by the resin is compared with the amount of reagent retained on the surface of glass beads or other impermeable particles having the same particle size as that of the resin particles. Such a comparison gives a value of relative permeability of a given reagent for sulfonium resins of varying crosslinkages.

The reaction between a vinylbenzylic sulfonium anion exchange resin and a nucleophilic reagent is advantageously carried out at a reaction temperature between 50° and 100° C. for a reaction time of several hours up to about 60 hours. If lower temperatures are employed, longer reaction times are generally desirable. Generally the nucleophilic reagent is present in excess up to about 200% of theory. The excess can be recovered, hence the amount of excess is not important. Alternatively, the exchange resin can be formed in situ from halomethyl-containing vinylaryl polymers and sulfides, as indicated and therein reacted with the indicated nucleophilic reagents. Thus, such a one-step method can be used instead of the two-step method wherein sulfonium resin intermediate is first formed and then reacted with a nucleophilic reagent, as indicated. The one-step method is shown in Example 7.

A method for preparing a vinylbenzylic sulfonium anion exchange resin reactant is as follows: A quantity of 100 grams of a chloromethylated copolymer containing in chemically combined form 2% by weight divinylbenzene, a small amount of ethylvinylbenzene, the balance styrene, 100 grams of dimethyl sulfide, 300 mls. of methylene dichloride, 300 mls, of methanol and 450 mls. of water were refluxed for 33 hours with stirring under a hood. The product beads were filtered, washed alternately with water, methanol then with water again. Titration with silver nitrate showed that the capacity of the wet beads was 0.67 milliequivalent (hereafter meq.) Cl−/ml. Total weight of the wet filtered product was 540 grams. The settled volume of 50 grams of the wet filtered product was 67 mls.

Examples which follow show ways in which the invention has been practiced. Typical reactions of this invention can be summarized by the following equation:

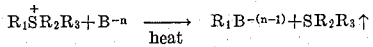

wherein

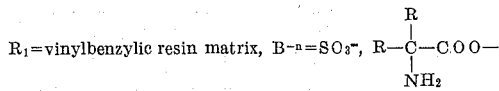

or other nucleophile wherein $n$ is an integer and $SR_2R_3$=sulfide, all as previously described in detail.

*Example 1.—Reaction of sulfonium resin with aqueous $Na_2SO_3$*

To 50 grams (67 mls. wet settled volume) of the filtered, washed sulfonium resin described above was added 25 grams of anhydrous sodium sulfite and 100 mls. of water. The mixture was covered loosely and heated on a steam bath under a hood for 40 hours and dimethyl sulfide was evolved. The resulting resin was filtered, rinsed alternately with water and concentrated hydrochloric acid, then given a final water rinse. Duplicate titrations with base showed the resin had a strong acid content of 0.68 meq./ml. A total of 57 mls, of wet settled cation exchange resin product was obtained. The basic resin structure was $RCH_2SO_3H$, wherein R represents the organic matrix.

*Example 2.—Reaction of sulfonium resin with aqueous $NaSCH_2CO_2Na$*

To 50 grams (67 mls. wet settled volume) of the filtered, washed sulfonium resin described above was added 33 grams of 95% thioglycolic acid, 100 mls. of water and 21 grams of 98% sodium hydroxide. The flask containing the mixture was covered loosely and the mixture was heated on a steam bath under a hood for 40 hours. The resulting cation exchange resin product was filtered, rinsed alternately with water and with concentrated hydrochloric acid, then given a final water rinse. The resulting resin was filtered and weighed and amounted to 19 grams of product. Its wet settled volume was 26 mls. This product was then treated with excess 10% sodium hydroxide solution, which caused it to swell. After washing with several bed volumes of water, the resulting beads had a wet filtered weight of 38.5 grams. Their wet settled volume was 52.5 mls. This resin absorbed $Cu^{++}$ strongly from an aqueous solution of copper sulfate, as indicated by a deep green color of the resin. The capacity for $Cu^{++}$ was 0.67 meq/ml. By conversion to the hydrogen form and measuring weakly acidic ion exchange capacity, its $-SCH_2COO-Na^+$ content was indicated to be 0.71 meq./ml. of bed.

*Example 3.—Reaction of sulfonium resin with aqueous $NH_2CH_2CO_2Na$*

To 50 grams (67 mls. wet settled volume) of the filtered, washed sulfonium resin described above was added 25 grams of glycine, 10 grams of 98% sodium hydroxide and 100 grams of water. The flask containing the mixture was covered loosely and the mixture was heated on a steam bath under a hood for 40 hours. The resulting resin was filtered, washed with ammonium acetate solution, then with water. Weight of the wet filtered resin was 20 grams. Its wet settled volume was 25.5 mls. This resin contained a large number of glycine groups, as indicated by the fact that it absorbed $Cu^{++}$ from an ammonium acetate buffered solution of copper sulfate, turning a deep blue.

A glass tube 1.04 cms. in diameter was filled with this resin to form a bed 25 cms. deep and having a volume of 20.5 mls. It was rinsed with excess ammonium acetate solution, then with water. The resulting bed was then rinsed over a period of 105 minutes with 25 mls. of a cobalt sulfate-nickel sulfate solution containing 0.52% Ni and 0.568% Co in approximately 1-normal ammonium acetate buffer. A green band was obtained at the top of the column and a pink band at the bottom. The color of the column was graduated in between top and bottom. The column was rinsed with approximately 50 mls. of water. Most of the pink band was eluted, leaving only a green color on the column, darkest at top, graduated to almost colorless at the bottom. Fractions 1 through 7 below were collected during these operations. The column was then washed with N-sulfuric acid, and fractions 8 and 9 were collected. The fractions analyzed as follows:

TABLE I

| Fraction | Volume, mls. | Color | Percent by wt. nickel | Percent by wt. cobalt |
| --- | --- | --- | --- | --- |
| Feed (blank) | | Dirty pink | 0.520 | 0.568 |
| 1 | 23 | Colorless | 0.0135 | 0.032 |
| 2 | 8 | Light pink | 0.0414 | 0.072 |
| 3 | 6 | Pink | 0.0514 | 0.371 |
| 4 | 7 | do | 0.0188 | 0.740 |
| 5 | 10 | do | 0.0043 | 0.494 |
| 6 | 10 | Light pink | 0.0004 | 0.015 |
| 7 | 21 | Colorless | 0 | 0.0007 |
| 8 | | | 0.0404 | 0.0110 |
| 9 | | Green | 0.454 | 0.0109 |

*Example 4.—Reaction of sulfonium resin with various water-soluble nucleophiles*

An anion exchange sulfonium resin made similarly to the preceding description by reacting stoichiometric proportions of beads of a chloromethylated crosslinked copolymer of 96 weight percent styrene and 4% divinylbenzene with dimethyl sulfide, containing 0.95 meq. of Cl−/ml. wet settled volume, was used to make a series of ion exchange resins as shown in Table II below. The reaction mixtures shown in Table II were heated in lightly covered flasks for two days on a steam bath (except diethylene triamine, 56 hours; β-mercaptoethane sulfonic acid, 32 hours; and N-(hydroxyethyl)ethylenediaminetriacetic acid, 17 hours).

TABLE II.—REACTANTS

| Resin No. | Percent Cross-linking | Sulfonium Resin, grams | Water, mls. | Nucleophile | Grams | Sodium Hydroxide, grams |
|---|---|---|---|---|---|---|
| 1 | 4 | 50 | 100 | o-Aminobenzene sulfonic acid | 20 | 4.0 |
| 2 | 4 | 50 | 50 | Taurine | 15 | 4.0 |
| 3 | 4 | 50 | 50 | N-(methyl)-taurine | 15 | 4.0 |
| 4 | 4 | 50 | 50 | Isoleucine | 15 | 4.0 |
| 5 | 4 | 50 | 50 | DL-phenylalanine | 20 | 4.0 |
| 6 | 4 | 50 | 50 | DL-alanine | 12 | 4.0 |
| 7 | 4 | 20 | 50 | Glutamic acid | 20 | 9.0 |
| 8 | 2 | 100 | 75 | N-(methyl)-glucamine | 30 | |
| 9 | 2 | 100 | 150 | Iminodiacetic acid | 40 | [1] 40 |
| 10 | 2 | 50 | 150 | Aspartic acid | 20 | [1] 20 |
| 11 | 2 | 50 | 75 | Methionine | 20 | 3.0 |
| 12 | 2 | 100 | 60 | Diethylene triamine | 48 | 0 |
| 13 | 2 | 100 | 200 | β-mercaptoethane sulfonic acid | 18 | 8 |
| 14 | 2 | 15 | 200 | N-(hydroxyethyl)ethylenediamine triacetic acid | 10 | 8 |

[1] $K_2CO_3$.

The resulting resins were filtered and washed alternately with water, acetone, water, N-sodium hydroxide and finally with water. They were then vacuum filtered and weighed. A quantity of 100 mls. of N/10 copper sulfate solution was passed through a sample of about 2.0 mls. of each resin. The resin samples were then rinsed with water and the $Cu^{++}$ on the resins was eluted with 100 mls. of 1-normal sulfuric acid. The copper sulfate was titrated iodometrically and the resin capacity was determined. The resin samples, after the sodium hydroxide and water washes, were dried overnight in vacuo at 38° C. The following Table III summarizes $Cu^{++}$ absorption data of the resins just described.

TABLE III

| Resin No. | Final Wt., g. | Final Wet Settled Vol., mls. | Meq. $Cu^{++}$ Absbd./ml. of Wet Settled Resin | Percent Weight Loss on Drying ($H_2O$ Content) |
|---|---|---|---|---|
| 1 | 31 | 38 | 0.83 | 25 |
| 2 | 31 | 40 | 0.78 | 38 |
| 3 | 33 | 42 | 0.60 | 39 |
| 4 | 30 | 39 | 0.22 | |
| 5 | 30 | 38 | 0.26 | |
| 6 | 27 | 35 | 0.30 | 36 |
| 7 | 30 | 38 | 0.52 | 40 |
| 8 | 72 | 90 | 0.60 | 37 |
| 9 | 83 | 98 | 1.04 | |
| 10 | 10 | 15 | 0.46 | 45.7 |
| 11 | 13 | 19 | 0.07 | |
| 12 | 36 | 55 | 0.55 | |
| 13 | 32 | 42 | [1] 0.82 | |
| 14 | 65 | 80 | 0.59 | |

[1] $H^+$ capacity, resin in $H^+$ form.

*Example 5.—Reaction of sulfonium resin with aqueous trisodium mercaptosuccinate*

A mixture of 100 grams (wet filtered weight) of a 2% crosslinked sulfonium resin, prepared as previously described, 50 grams of mercaptosuccinic acid, 35 grams of 98% sodium hydroxide pellets and 300 mls. of water were heated on a steam bath under a hood for 48 hours in a flask provided with a reflux condenser and a stirrer. The cation exchange resin beads so obtained were filtered, washed with several bed volumes of water and weighed. Their wet filtered weight was 99 grams. The resulting wet resin was rinsed with 8-normal hydrochloric acid, whereupon it shrank approximately 30%. After washing alternately with several bed volumes of 10% sodium hydroxide and water, the wet filtered resin weight was again 99 grams. The wet settled volume of the resulting resin beads was 133 mls. It had a $Cu^{++}$ capacity of 0.91 meq./ml.

*Example 6.—Reaction of sulfonium resin with aqueous disodium iminodiacetate*

A mixture of 50 grams (wet filtered weight) of a 2% crosslinked sulfonium resin, prepared as previously indicated, 20 grams of iminodiacetic acid, 20 grams of anhydrous potassium carbonate and 150 mls. of water was heated on a steam bath under a hood for 56 hours without agitation. The resulting resin was filtered and rinsed with several bed volumes of water. Its wet settled volume was then 37.5 mls. while its wet filtered weight was 27 grams. It had a $Cu^{++}$ capacity of 0.83 meq./ml.

*Example 7.—In situ reaction (one-step method)*

A quantity of 50 grams of beads of a chloromethylated crosslinked copolymer of a preponderance of styrene, a small amount of ethylvinylbenzene and 4% divinylbenzene (50–100 mesh, 16.2% Cl), 120 grams of mercaptosuccinic acid, 85 grams of sodium hydroxide pellets, 125 grams of toluene, 150 mls. of dioxane, 250 mls. of water and 100 mls. of dimethyl sulfide was mixed together in a two-liter, three-necked flask equipped with a stirrer and an efficient reflux condenser. The mixture was heated at reflux (62° C.) for 21 hours. The product resin was filtered and washed well with water, methanol, and again with water. Final volume of wet resin product was 168 mls. The wet product had a capacity for $Cu^{++}$ of 1.56 meq./ml. (0.73 gram atoms $Cu^{++}$/liter).

*Example 8.—Reaction in presence of a polar solvent*

A quantity of 100 grams of wet filtered water-swollen sulfonium resin (about 134 mls. wet settled volume, capacity 0.84 meq. $Cl^-$/ml.), prepared as above-indicated and contained in a filter funnel, was rinsed well and dehydrated with about two liters of commercial grade methanol. The sulfonium resin, 300 mls. of methanol, and 50 mls. of anhydrous dimethylethanolamine (97%) were stirred at reflux for 24 hours. The anion exchange resin product was filtered and washed well with water, methanol, N-hydrochloric acid and again with water. The final wet settled volume of the resin product was 127 mls. The resin had a wet settled $Cl^-$ capacity of 0.80 meq./ml. A sample of the product resin was dried on a moisture balance and had a weight loss of 67.7%. Its nitrogen content was 4.66%.

*Example 9.—Reaction after removal of solvent*

A quantity of 13 mls. of sulfonium resin (from chloromethylated 2% crosslinked polystyrene beads, 50–100 mesh) which had a wet settled volume capacity of 0.84 meq. $Cl^-$/ml., was placed in a small column and rinsed with one liter of N—$Na_2SO_3$. The resin was then rinsed with water, 500 mls. of methanol, 500 mls. of acetone, 500 mls. of ether, and air dried a few minutes. The beads containing chemically absorbed sulfite were heated at about 95° C. in a container protected with a drying tube for about 16 hours. The product beads then were heated with 8 N—HCl (sufficient to slurry the mixture) for about 16 hours. The beads were then rinsed extensively with water. They had a wet volume of 5 mls. and a strong acid cation exchange capacity of 0.21 meq./ml.

*Example 10.—Highly cross-linked bead cation exchanger*

A quantity of 5.0 mls. of sulfonium resin prepared from 16% divinylbenzene-crosslinked chloromethylstyrene and dimethyl sulfide, having 1.74 meq. Cl⁻/ml. of wet settled resin, 5.0 grams of $Na_2SO_3$ and 50 mls. of water was heated on a steam bath for 24 hours. The filtered resin was rinsed with water, 4 N—HCl, and again with water. The wet settled volume of the beads was 4.2 mls. The beads had 0.36 meq./ml. of strongly acid cation exchange capacity.

*Example 11.—Preparation of cation exchange resins from sulfonium sulfate and carbonate resins*

Approximately 20 mls. of 4% crosslinked sulfonium resin, 1.06 meq. Cl⁻/ml., was placed in a column and converted to the sulfate form by rinsing with one liter of 0.05 N—$Na_2SO_4$. The resin was then rinsed well with water, and had a volume of 22 mls. and a residual ionic chloride content of less than 0.002 meq./ml. of wet settled volume.

The sulfonium sulfate resin (15 mls.) was heated overnight on a steam bath with 50 mls. of water and 43 grams of a 25% solution of disodium iminodiacetate. The re-

*Example 13.—No added swelling agent*

The procedure of Example 12 was repeated, except that the sulfonium resin beads were dehydrated by rinsing with methanol, then with ether. The dehydrated sulfonium resin beads weighed 20 grams, equivalent to 57.4 grams of water-swollen beads. The product beads after washing with water had a wet settled volume of 51 mls. The product beads had a chloride capacity of 0.1 meq./ml., and a weight loss on drying of 59.3%. The dried product beads contained 4.17% nitrogen.

*Example 14.—Comparative reactions of different sulfonium resins*

Sulfonium anion exchange resins prepared by reacting 2% crosslinked-chloromethylated polystyrene with methyl hydroxyethyl sulfide (I), diethyl sulfide (II) and dimethyl sulfide (III) were reacted with trisodium mercaptosuccinate and compared as to properties. Comparative preparations and properties are summarized in the following table.

TABLE IV

| | Reaction Conditions | | | Product Unit Structure | Properties of Product | |
|---|---|---|---|---|---|---|
| | Wt. Sulfonium Resin (wet filtered) | Wt. Reactant | Solvent, etc. | | Wet Settled Volume, mls. | Wet Volume Capacity, meq. Cu/ml. |
| I | 94 g. (9.9 mls.) | 5.0 g. mercaptosuccinic acid | 3.5 g. NaOH pellets plus 150 mls. $H_2O$. Refluxed for 47 hours. | R—$CH_2$—SCH COONa<br>\|<br>$CH_2$COONa | 9.9 | 0.71 |
| II | 10.3 g. (10.3 mls.) | do | do | R—$CH_2$—SCH COONa<br>\|<br>$CH^2$COONa | 9.5 | 0.95 |
| III | 100 g. (134 mls.) | 50 g. mercaptosuccinic acid | 35 g. NaOH pellets plus 300 mls. $H_2O$. Heated on steam bath 48 hours. | R=—$CH_2$—CH—$C_6H_4$— | 133 | 0.19 | sulting anion exchange resin was filtered and rinsed well with water, methanol, and again with water. A 5.0 ml. sample of the resin was rinsed with 200 mls. of N/10 $CuSO_4$ solution and then with water. The resin absorbed 1.10 meq. of Cu⁺⁺/ml. of wet settled volume. The total volume of product resin was 12.5 mls.

The preceding procedure was repeated, except that the original resin was converted to the carbonate form by the use of one liter of 0.05 N—$Na_2CO_3$ solution. The bed volume of resin in the carbonate form was 24 mls. Its residual chloride was less than 0.003 meq./ml. The final resin after reaction of the above with iminodiacetate solution had a wet settled volume of 11.2 mls. and a Cu⁺⁺ capacity of 1.12 meq./ml.

*Example 12.—Resin preparation with water-insoluble solvents*

A quantity of 20 grams (approximately 26 mls.) of 2% crosslinked sulfonium resin beads, 0.84 meq. Cl⁻/ml., was washed with water and filtered. Then 50 mls. of toluene and 10 mls. of 97% $Me_2NCH_2CH_2OH$ were added. The mixture was heated on a steam bath overnight in a capped bottle. The resulting anion exchange resin was filtered, washed with dilute HCl, and then with water. The wet resin had a capacity of 0.74 meq. Cl⁻/ml. of bed (total bed volume was 18 mls.). The wet resin was dried (weight loss was 69%) and analyzed for nitrogen. Its nitrogen content was 4.66%.

The preceding procedure was repeated, except that 20 grams of beads which contained only methanol as swelling agent, equivalent to 27.5 grams of water-swollen beads, was used. Final volume of product was 30 mls. Its chloride capacity was 0.78 meq./ml. Weight loss on drying the product was 67%. Nitrogen content of dried product was 4.53%.

*Example 15.—Reaction of sulfonium resin made from tetramethylene sulfide with $Na_2SO_3$*

A quantity of 5.0 mls., wet settled volume, of 1% crosslinked sulfonium resin beads, having a wet volume capacity of 0.41 meq. Cl⁻/ml., prepared by reacting a polymeric chloromethylstyrene with tetramethylene sulfide to the extent of 50%, was heated on a steam bath to 80°–90° C. with 50 mls. of water and 2.0 grams of $Na_2SO_3$ for 18 hours. The volume of the resulting product after washing with water, then with 12-normal hydrochloric acid, then with water, was 9.2 mls. A total of 3.3 meq. of exchangeable H⁺ ions was present in the water washed product, or 0.36 meq. H⁺/ml. The sulfonium chloride groups had reacted to form $SO_3^-Na^+$ groups. Since the final product contained a total of 3.3 meq. of exchangeable H⁺ and the starting material, a 5/15.5 aliquot of a 12.3 meq. total Cl⁻ resin, yields a theoretical total of 4.0 meq. H⁺, based on Cl⁻ content of the starting chloromethylated resin beads, the precent conversion of sulfonium chloride to —$SO_3Na$ was $3.3 \times 100/4.0$ or about 82%.

*Example 16.—Reaction with iminodiacetonitrile*

A quantity of 27 grams of vinylbenzyl dimethylsulfonium chloride resin, 1% DVB crosslinked, 50–100 U.S. mesh size, methanol wet capacity 0.94 meq./wet gram, 7.0 grams $HN(CH_2CN)_2$, 22 grams methanol, 54 grams ethylene glycol, 20 grams $C_2H_5OCH_2CH_2OCH_2CH_2OH$ was mixed and heated on a steam bath for 64 hours. Resin product was filtered and washed successively with water, acetone and water. Weight of filtered resin product was 9 grams of dark brown product. Its percent moisture was 38. After centrifuging the product, its moisture content was 22%. A dry sample of resin had a nitrogen analysis of 7.71±0.10% N.

A quantity of 2.0 grams of the wet filtered product resin was heated 4 days on a steam bath with aqueous 9 molar HBr. Product resin was dark brown. Its volume was 2.6 mls. (wet settled). Its capacity for Cu++ from ammoniacal solution was 0.34/2.6=0.13 meq./ml. This indicated that

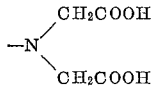

groups were formed on hydrolysis.

*Example 17.—Reaction with ammonia*

A quantity of 100 mls. of commercial concentrated aqueous ammonia and 40 grams of the sulfonium resin of Example 16 ($CH_3OH$ wet, filtered) was heated together on a steam bath for 64 hours. Yield was 11.5 grams (17 mls. wet settled volume in water) of a light tan resin. That it possessed vinylbenzylamine groupings was proved by the fact that the resin turned light green when washed with aqueous $CuSO_4$ solution, then with water. The product resin, which had been rinsed successively with water, acetone and water, had a water content (loss on drying) of 39.6%. The centrifuged resin product had a water content of 38.3%. A dried sample gave a nitrogen analysis of 2.93±0.09%.

*Example 18.—Reaction with sodium thiosulfate*

To 20 grams of the $CH_3OH$ swollen resin of Example 16 was added 15 grams of solid $Na_2S_2O_3$. The mixture was heated with 100 mls. of $HOCH_2CH_2OH$ on a steam bath for 64 hours. Final resin, washed successively with water, acetone and water, then filtered, weighed 24 grams. It turned dark blue in ammoniacal $CuSO_4$ solution. Water content of the wet vacuum filtered resin was 76% after centrifugation. Its copper capacity, aqueous dilute $CuSO_4$, was 0.47 meq./ml.

In an analogous experiment, using water only as solvent in reacting the sulfonium resin and the $Na_2S_2O_3$, a resin was obtained having very similar properties and having 0.51 meq. Cu++ capacity per ml. of Na+ form of resin. The product resin was found to be convertible with a hydrochloric acid wash to a resin having 0.46 meq. strongly acidic capacity per ml. of Na+ form resin converted. This indicates that the resin was polymeric vinylbenzyl thiosulfate, Na+ form.

*Example 19.—Reaction with p-sulfanilamide*

To 16 grams of p-sulfanilamide in 23 grams of ethylene glycol plus 16 grams of monoethyl ether of ethylene glycol was added 16 grams of methanol-wet filtered vinylbenzyl dimethylsulfonium chloride resin, crosslinked with 1% DVB. This mixture was heated on a steam bath for 64 hours under a hood. The product resin was washed successively with water, acetone and water and vacuum filtered. Weight of product resin was 7 grams. Its water content was 25.1%. The centrifuged product contained 21.8% water. The dry resin was found to have 6.13±0.03% N.

*Example 20.—Reaction with p-aminoacetophenone*

To 5 grams of p-aminoacetophenone in 30 grams ethylene glycol was added 15 grams of filtered $CH_3OH$ swollen 1% DVB crosslinked vinylbenzyl dimethylsulfonium chloride anion exchange resin. The mixture was heated for 64 hours on a steam bath. Filtered resin product was washed successively with water, acetone and water. It weighed 4 grams and had a water content of 16.8%. The centrifuged resin product had a water content of 13.1%. Its percent N, dry resin basis, was 4.04±0.05%.

*Example 21.—Reaction with hydrazine plus dimethylethanolamine*

To 150 mls. of 1% DVB crosslinked, 50–100 mesh polymeric vinylbenzyl dimethylsulfonium chloride resin (75 meq./ml.) was added sufficient water to fill the resin voids (ca. 65 mls.) plus 10 mls. (total of 75 mls. water added to wet the resin). Then 109 meq. (5.5 grams) of hydrazine (prac., aq. 64% solution) and 32 meq. (2.75 grams) of pure dimethylethanolamine were added. The mixture was heated on the steam bath for 62 hours. The filtered product beads were rinsed successively with water, with two liters of aqueous 3-normal NaOH, and with water. Volume of wet resin product was 60 mls. A sample (2.3 mls.) was eluted with 400 mls. of 4% NaCl. Found NaOH in eluate was 0.45 meq. Then a 30 mls. sample of the resin, OH form, was placed in an excess of 0.100-normal hydrochloric acid, and the resin was filtered off after 2 days. Found consumption of HCl was 0.60 meq. Thus, the strong base capacity of the resin, due to dimethylethanolimino groups, was 0.2 meq./ml., and the weak base capacity, due to hydrazino groups, was 0.3 meq./ml.

*Example 22.—Reaction with diethyl malonate*

A quantity of 255 mls. of 2% DVB crosslinked polymeric vinylbenzyl dimethylsulfonium chloride resin beads, 50–100 U.S. mesh, 0.84 meq./ml., was rinsed with three liters of commercial methanol and allowed to stand in methanol for one day. To such beads and methanol (total volume 400 mls.) was added 110 grams of diethyl malonate and 20 grams of commercial sodium methylate. The mixture became warm and was heated at reflux with stirring for 64 hours. The resulting product beads were washed with methanol then with water, to give a wet-filtered weight of 156 grams.

The resulting water-wet beads, 70 grams of NaOH pellets, 200 mls. of water and 150 mls. of diethylene glycol were heated together on a steam bath for 18 hours. The product beads were filtered and washed successively with water, methanol and water. Their wet filtered weight was 151 grams. A portion thereof was analyzed and found to have a Cu++ capacity of 1.24 meq./ml., indicating that most of the ester groups had been hydrolyzed to carboxyl groups. It was necessary to continue the hydrolysis of the beads in the water-ethylene glycol-NaOH mixture for an additional 42 hours in order to hydrolyze substantially all of the ester groups. The product, containing methenyl dicarboxylate groups attached through methenyl carbon atoms to benzylic carbon atoms of the polymer had a Cu++ capacity of 1.40 meq./ml.

The following examples are presented to demonstrate the reactivity of representative ionizable nucleophilic reagents with benzyl chloride under conditions as specified above to characterize those reagents which are operable in the process of this invention.

*Example 23.—Reaction of benzyl chloride with ammonia*

To 0.25 ml., 2.18 meq., of benzyl chloride (hereafter BzCl) in 25 mls. of stock solution (65% ethanol, 35% water) was added 1.60 mls. 15-normal aqueous ammonia. The mixture was reacted at room temperature in a capped, mechanically shaken bottle for 17.5 hours. Then 25 mls. of stock solution and excess sulfuric acid were added to the sample, and it was titrated potentiometrically for chloride ion. Found: percent reaction was 9.6. Found: percent reaction on a blank, wherein 0.25 ml. BzCl and 25 mls. stock solution were shaken for 17.5 hours at room temperature, was 3.5%. Net reaction of BzCl with $NH_3$ thus was 6.1% of theory for complete reaction.

*Example 24.—Reaction of benzyl chloride with dimethylethanolamine*

The procedure of Example 22 was repeated with 0.300 gram $Me_2NCH_2CH_2OH$, 3.37 meq., in place of ammonia. Found: net reaction of $Me_2NCH_2CH_2OH$ with BzCl to liberate Cl− was 94.5% of theoretical.

*Example 25.—Reaction of benzyl chloride with isoleucine*

The procedure of Example 22 was repeated with 0.300 gram of isoleucine, 2.29 meq., in place of ammonia. Found: net reaction was 51% of theoretical.

*Example 26.—Reaction of benzyl chloride with iminodiacetic acid disodium salt*

The procedure of Example 22 was repeated with 0.300 gram $NH(CH_2COOH)_2$, 2.27 meq. plus 1.14 mls. 2-normal NaOH, 2.28 meq. in place of ammonia. Found: net reaction was 8.4%.

*Example 27.—Reaction of benzyl chloride with p-aminoacetophenone*

The procedure of Example 22 was repeated with 0.300 gram p-aminoacetophenone, 2.22 meq., in place of ammonia. Found: net reaction was 13%.

*Example 28.—Reaction of benzyl chloride with sodium sulfite*

The procedure of Example 22 was repeated with 0.300 gram $Na_2SO_3$ in place of ammonia. Found: net reaction was 14.8%.

What is claimed is:

1. A method for making an exchange resin by reacting in substantially stoichiometric proportions at a reaction temperature of 50°–100° C. a vinylbenzylic sulfonium anion exchange resin with an ionizable nucleophilic reagent of the group consisting of those which have one or more exchanging moieties and those which have one or more ester, amide, nitrile or alkanol moieties which can be converted to exchanging moieties by hydrolysis or oxidation reactions, respectively, and is soluble to the extent of at least 5% by weight in a member of the group consisting of water and aliphatic liquid alcohols having from 1 to 10 carbon atoms in the molecule, said reagent being one having a property of reacting in stoichiometric proportions with benzyl chloride at 20° to 100° C. to displace at least 5 mole percent of chloride therefrom in 48 hours, which reagent comprises a group which reacts to establish a covalent bond with the benzylic carbon atom of the resin and to yield a sulfide by-product, to give a substituted vinylbenzylic resin of the group consisting of those which possess exchanging moieties and those which have one or more ester, amide, nitrile or alkanol groups which can be converted to have exchanging moieties by hydrolysis or oxidation reactions.

2. The method of claim 1 wherein the nucleophilic reagent is an amino acid salt.

3. The method of claim 1 wherein the nucleophilic reagent is an amine.

4. The method of claim 1 wherein the nucleophilic reagent is a mercaptocarboxylic acid.

5. The method of claim 1 wherein the nucleophilic reagent is an alkali metal salt of a dialkyl ester of malonic acid.

6. The method of claim 1 wherein the nucleophilic reagent is sodium sulfite.

7. The method of claim 1 wherein the nucleophilic reagent is sodium thioglycolate.

8. The method of claim 1 wherein the nucleophilic reagent is sodium glycinate.

9. The method of claim 1 wherein the nucleophilic reagent is trisodium mercaptosuccinate.

10. The method of claim 1 wherein the nucleophilic reagent is disodium iminodiacetate.

11. The method of claim 1 wherein the nucleophilic reagent is dimethyl ethanolamine.

12. The method of claim 1 wherein the nucleophilic reagent is diethylene triamine.

13. The method of claim 1 wherein the nucleophilic reagent is N(methyl)-glucamine.

14. The method of claim 1 wherein the reaction medium is a polar solvent for the reagent.

15. The method of claim 1 wherein the reaction medium is water.

16. The method of claim 1 wherein the poly(vinylbenzylic sulfonium) anion exchange resin is formed in situ from a poly(halomethyl-containing vinylaryl) compound and a sulfide having the formula $R_3R_2S$ wherein $R_3$ and $R_2$ individually represent a member of the group consisting of 1 to 4 carbon alkyl radicals and 2 to 4 carbon hydroxyalkyl radicals and together represent polymethylene groups and 1 to 4 carbon alkyl-substituted polymethylene groups having a total of 4 to 12 carbon atoms.

17. A polymeric vinylbenzylic ion exchange resin, the matrix of which has a preponderance of combined vinylbenzylic groups crosslinked with 0.2–20 weight percent of a dialkenyl crosslinking agent, having, as exchanging groups covalently attached to benzylic carbon atoms, a member of the group consisting of thiosulfate groups, attached through oxygen-free sulfur atoms; methenyl dicarboxylate groups, attached through methenyl carbon atoms; and iminoacetophenone groups, attached through imino nitrogen atoms.

18. A polymeric vinylbenzylic thiosulfate ion exchange resin, the matrix of which has a preponderance of combined vinylbenzylic groups crosslinked with 0.2–20 weight percent of a dialkenyl crosslinking agent, having thiosulfate exchanging groups covalently attached through oxygen-free sulfur atoms to benzylic carbon atoms.

19. A polymeric vinylbenzylic methenyl dicarboxylate ion exchange resin, the matrix of which has a preponderance of combined vinylbenzylic groups crosslinked with 0.2–20 weight percent of a dialkenyl crosslinking agent, having methenyl dicarboxylate groups covalently attached through methenyl carbon atoms to benzylic carbon atoms.

20. A polymeric vinylbenzylic iminoacetophenone ion exchange resin, the matrix of which has a preponderance of combined vinylbenzylic groups crosslinked with 0.2–20 weight percent of a dialkenyl crosslinking agent, having iminoacetophenone groups covalently attached through imino nitrogen atoms to benzylic carbon atoms.

References Cited by the Examiner

UNITED STATES PATENTS

| | | | |
|---|---|---|---|
| 2,713,038 | 7/1955 | De Jong | 260—2.1 |
| 2,768,990 | 10/1956 | De Jong | 260—2.1 |
| 2,895,925 | 7/1959 | Hwa | 260—2.1 |
| 3,013,994 | 12/1961 | Hatch | 260—2.1 |

OTHER REFERENCES

Toennies et al.: J.A.C.S., vol. 67, pp. 1141–4, July 1945.

WILLIAM H. SHORT, *Primary Examiner.*

HAROLD N. BURSTEIN, J. C. MARTIN, C. A. WENDEL, *Assistant Examiners.*